US009524359B2

(12) United States Patent
Favier et al.

(10) Patent No.: US 9,524,359 B2
(45) Date of Patent: *Dec. 20, 2016

(54) METHOD AND APPARATUS FOR DISCRETE ELEMENT MODELING WITH A VIRTUAL GEOMETRY OBJECT

(71) Applicant: DEM SOLUTIONS LTD., Edinburgh, Midlothian (GB)

(72) Inventors: John Favier, Edinburgh (GB); Andrew Milne, Edinburgh (GB)

(73) Assignee: DEM SOLUTIONS LIMITED, Edinburgh (GB)

(*) Notice: Subject to any disclaimer, the term of this patent is extended or adjusted under 35 U.S.C. 154(b) by 331 days.

This patent is subject to a terminal disclaimer.

(21) Appl. No.: 13/960,039

(22) Filed: Aug. 6, 2013

(65) Prior Publication Data

US 2013/0332127 A1    Dec. 12, 2013

Related U.S. Application Data

(63) Continuation of application No. 12/538,769, filed on Aug. 10, 2009, now Pat. No. 8,531,463.

(51) Int. Cl.
  *G06T 17/00*    (2006.01)
  *G06F 17/50*    (2006.01)
  *G06T 13/20*    (2011.01)

(52) U.S. Cl.
  CPC ........... *G06F 17/5009* (2013.01); *G06T 13/20* (2013.01); *G06F 17/5018* (2013.01); *G06F 2217/16* (2013.01); *G06T 2210/12* (2013.01); *G06T 2210/56* (2013.01)

(58) Field of Classification Search
  CPC .................... G06F 17/5009; G06F 17/5018
  USPC ................. 345/473, 474; 703/7–12
  See application file for complete search history.

(56) References Cited

PUBLICATIONS

EDEM 2.0 User Guide, Apr. 2008, pp. 1-128.*
"EDEM 2.1 User Guide", DEMSolutions, revision 3E, 2008 DEM Solutions, pp. 1-6, 24-31, 47-49, 59-69.

\* cited by examiner

*Primary Examiner* — Barry Drennan
*Assistant Examiner* — Robert Craddock
(74) *Attorney, Agent, or Firm* — Park, Vaughan, Fleming & Dowler LLP (57) ABSTRACT

A method is described for discrete element modelling and for performing a three-dimensional simulation through time of a plurality of discrete elements corresponding to particles and physical geometry elements. The method can comprise the following operations: providing a virtual geometry object comprising a user-defined shape (the virtual geometry object does not undergo physical interaction with the particles or physical geometry elements during the simulation); receiving user-defined parameters for determining the position, orientation and any movement of the virtual geometry object with respect to the three-dimensional space; locating the virtual geometry object in the three-dimensional space during the simulation in accordance with the user-defined parameters; and/or identifying the particles, physical geometry elements and/or physical interactions having a particular relationship with respect to the virtual geometry object. The identified elements can then be analyzed by the user.

21 Claims, 7 Drawing Sheets

METHOD AND APPARATUS FOR DISCRETE ELEMENT MODELING WITH A VIRTUAL GEOMETRY OBJECT

RELATED APPLICATION

The present patent is a continuation of, and hereby claims priority under 35 U.S.C §120 to, pending U.S. patent application Ser. No. 12/538,769, entitled "Method and Apparatus for Discrete Element Modeling with a Virtual Geometry Object," by inventors John Favier and Andrew Milne, filed on 10 Aug. 2009.

FIELD OF THE INVENTION

The present invention relates to simulation systems, and in particular to simulation systems based on discrete element modeling (DEM).

BACKGROUND OF THE INVENTION

Discrete element modeling (also referred to as discrete particle, distinct element, or distinct particle modeling) is used for simulating a wide range of physical, industrial, engineering and/or manufacturing processes and operations. The discrete elements, also referred to as particles, represent objects located in a three-dimensional space that interact dynamically with each other and their surroundings subject to specified physical models or heuristics. The physical interactions are often based on surface contact, although other forces, such as electromagnetic field effects and/or fluid drag, may also be involved. The particles are often defined as being of finite (non-zero) size, but may in some simulations be treated as point objects.

Discrete element modeling allows for the simulation, analysis and visualization of particulate flows, and is able to provide high-resolution information on properties such as particle kinematics, momentum, and heat and mass transfer in bulk particle deformation and flow. It is used for the design, development and testing of products and processes, allowing these to be performed faster and more accurately, thereby reducing development costs and time to market. Discrete element modelling finds application in a wide range of scientific and technological industries, for example pharmaceutical, chemical, mineral and materials processing, oil & gas production, and agricultural, construction and geotechnical engineering.

Examples of particle behaviours that may be simulated and hence better understood via discrete element modeling include: the transfer of materials between conveyors, the filling and emptying of hoppers, the mixing and blending of powders and fluids, the sieving and segregation of particles, the mining and excavation by machine of soil and rock, the coating of tablets and pellets, the handling and charging of printer toner, etc.

An example of a discrete element modelling system is EDEM version 2.1.2, which is currently available from DEM Solutions, see www.dem-solutions.com. Discrete element modeling systems such as EDEM have increased considerably in sophistication over the years, and this has led to greater complexity of simulation output. It is important to provide enhanced facilities for analysing and interpreting this output in order to advance the exploitation and utilisation of the simulation results.

SUMMARY OF THE INVENTION

One embodiment of the invention provides a computer-implemented method for discrete element modelling of a plurality of discrete elements corresponding to particles and physical geometry elements. The modelling performs a simulation through time of physical interactions of the particles with each other and with the physical geometry elements in a three-dimensional space. The method comprises providing a virtual geometry object comprising a user-defined shape, wherein the virtual geometry object does not undergo physical interaction with the particles or physical geometry elements during the simulation. The method further comprises receiving user-defined parameters for determining the position, orientation and any movement of the virtual geometry object with respect to the three-dimensional space. The method further comprises locating the virtual geometry object in the three-dimensional space during the simulation in accordance with the user-defined parameters and identifying the particles, physical geometry elements and/or physical interactions having a specified relationship with respect to the virtual geometry object.

In one embodiment, the identification of the particles, physical geometry elements and/or physical interactions having a specified relationship with respect to the virtual geometry object is performed in respect of data produced by the simulation after completion of the simulation. This can then support user understanding and investigation of the results. It is also possible to perform the identification of the particles, physical geometry elements and/or physical interactions while the simulation is in progress and is used to alter subsequent timesteps of the simulation.

In one embodiment, the shape of the virtual geometry object defines a closed or complete three-dimensional volume, and the specified relationship involves determining the number of model elements located within the closed three-dimensional volume. Another possibility is that the virtual geometry object comprises a surface, and the specified relationship involves those particles, physical geometry elements and/or physical interactions that lie within a predetermined distance of the surface. A further possibility is that the virtual geometry object comprises a surface, and the specified relationship involves those particles, physical geometry elements and/or physical interactions that pass through the surface in a given time interval. The skilled person will be aware of other possible relationships for selected particles or other model elements vis-a-vis the virtual geometry object.

In certain embodiments, the shape of the virtual geometry object is specified by a surface or volume mesh. This mesh can be defined within the simulation itself, or imported from an external tool such as a computer-aided design system.

In certain embodiments, a user specifies movement of the virtual geometry object through time with respect to the three-dimensional space. One way of doing this is to link the virtual geometry object to a physical geometry element such that the virtual geometry object has the same movement through the three-dimensional space as the linked physical geometry element. Other possible mechanisms include providing a look-up table or file of positions for the virtual geometry object, or providing such positions using an external system.

The virtual geometry object may comprise multiple virtual geometry elements, each of which can itself be regarded as a virtual geometry object. This allows a user to understand different hierarchical levels of a simulation. For example, a bucket may contain multiple compartments. A virtual geometry object may be linked to the bucket itself, and each of the compartments may be linked to a corresponding virtual geometry element within the virtual geometry object. This allows a user to investigate simultaneously both the behaviour of the individual compartments and also bucket as a whole.

The invention further provides an apparatus and computer program and computer readable medium such as a disk drive, flash memory, optical disk, etc, containing such a program for implementing such a method.

BRIEF DESCRIPTION OF THE DRAWINGS

Various embodiments of the invention will now be described in detail by way of example only with reference to the following drawings.

DETAILED DESCRIPTION

Figure 1:
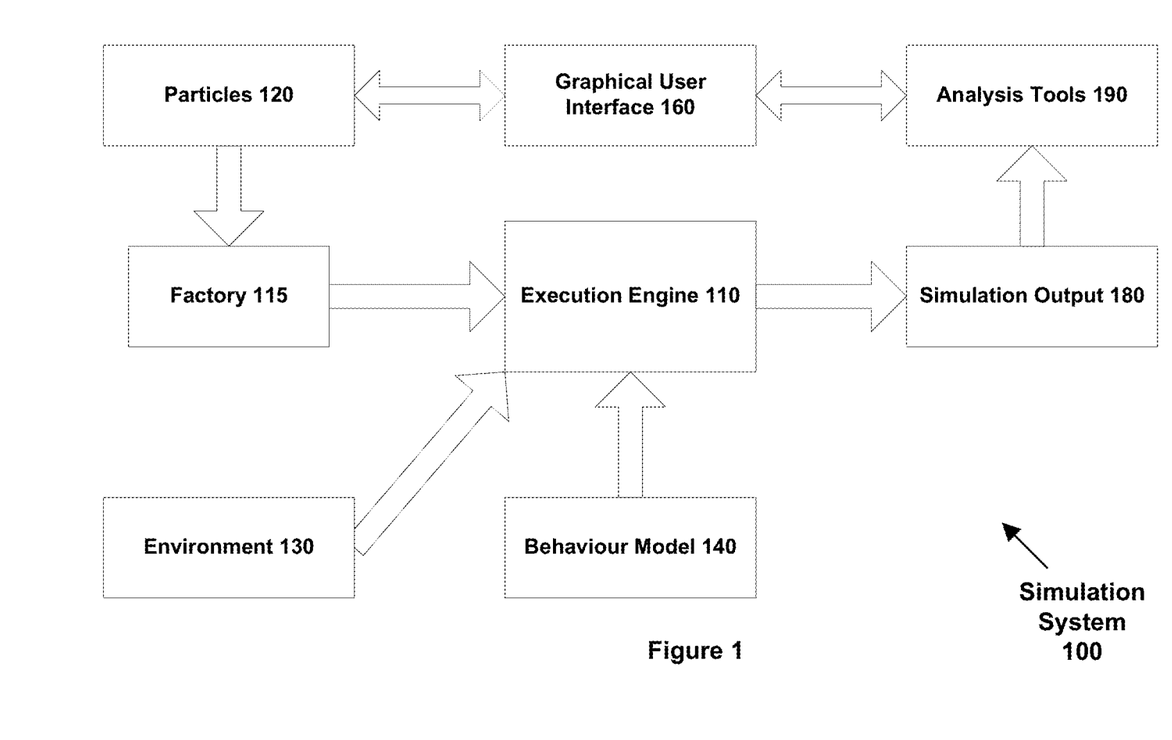
FIG. 1 is a schematic diagram showing the operation of a simulation system in accordance with one embodiment of the invention.

FIG. 1 is a schematic diagram showing the operation of a simulation system 100 in accordance with one embodiment of the invention. The simulation system is based on an execution engine 110 which takes as input:
  a set of particles 120 with properties, such as shape, size, etc. The properties typically specify physical attributes of the particles, as well as parameters for use in the simulation, such as residence time. The system supports multiple different types of particles in a single simulation. Particles may have various shapes and may comprise one or more particle elements. In one embodiment, the particle elements are spheres, but other embodiments may use other geometric shapes based on other surface geometry functions such as lines, discs, triangles, other planar elements, torus, ellipsoids, hyperellipsoids, etc.
  an environment 130 specifying the surroundings of the particles, including boundary conditions and physical geometry elements. The environment determines the presence of other objects with which the particles may interact and whose behaviour is controlled separately from the particles themselves. The environment may define (for example) the size and shape of a container holding the particles, any objects within the container, plus any operational movement (such as for a conveyor belt). The environment may also specify fluids or fields, such as electric or magnetic, with which the particles may interact, e.g. to exchange momentum, mass or energy; and
  behaviour model 140 (also referred to as a physics model), which specifies the interactions of the particles (with each other and also with the surroundings as specified by the environment). One or more behaviour models 140 can be added as plug-ins to simulation system 100. Different behaviour models may apply to different interactions, e.g. particle-particle, particle-geometry, or particle-media. The interactions may result in the modification of some physical property of the particles, such as an exchange of momentum, mass or energy between the discrete elements, or between the discrete elements and their surroundings. An interaction may also change attributes of the discrete elements due to the operation of heuristics or other laws governing the interaction. For example, the presence of a particle in a particular location may change the value of an attribute such as color, a flag to indicate that the particle passed this way, the amount of time spent near a given surface, etc.

The simulation system includes one or more factories 115 which generate particle instances for use in the simulation corresponding to the template of particle properties and attributes. The factory initialises the inertial and dynamic conditions of each particle, including attributes such as size, shape, position, velocity etc.

The simulation system 100 also includes an execution engine (also referred to as the core solver) to determine the simulation outcome 180, based on the specified boundary conditions 130 and the behaviour model 140. This usually involves the execution engine performing many iterations to calculate particle behaviour over time.

The simulation system 100 further includes a graphical user interface (GUI) 160 and a range of analysis tools 190. The simulation output 180 can then be viewed and investigated via GUI 160 using analysis tools 190 to provide a better understanding of particle behaviour. For example, GUI 160 may support a graphical representation showing the path of travel for a particle as the simulation progresses. In addition, the simulation output 180 can be exported for analysis elsewhere, or for input to a further simulation.

Simulation system 100 provides particles 120 with a predefined set of fixed properties, for example size. Simulation system 100 also supports the assignment of customised properties to particles 120 to supplement the fixed properties. A generic framework is provided to allow arbitrary user-defined properties (also referred to as attributes or tags) to be assigned to a particle (i.e. a discrete entity or element) in a DEM. These properties are utilised both during the simulation solution itself by execution engine 110, and are also available for use in post-processing operations on a DEM simulation, such as by analysis tools 190. For example, the values of the custom particle properties are passed to the relevant behaviour model(s) for use in calculating particle interactions. The assignment of customised properties to particles can be performed automatically by a behaviour model 140; alternatively custom particle properties can also be added to particles 120 using GUI 160.

As described above, simulation system 100 includes factories 115 for creating particle instances during a simulation. The EDEM version 2.1.2 simulation system supports a "virtual geometry" for the initialisation of particles produced by factories 115. This virtual geometry does not interact with the particles or other objects, in contrast to the physical geometry elements of the environment 130 that do interact with the particles. Both the physical geometry elements and the virtual geometry elements for the initialisation of particles may be created within the simulation system itself, or else generated with a computer-aided design (CAD) system and then imported into the simulation system.

The factories 115 initialise particles by placing particles (for example) on the surface or within the closed volume of a virtual geometry section, or within the closed volume of a physical geometry section. As with the fixed particle properties, a factory has a list of factory parameters, one for each custom property. The parameters allow a user to dictate the initial value of the corresponding properties for particles created by the factory. For each parameter, the user can specify whether the initial value is set as: (a) a fixed (predefined) value, (ii) a random value, or (iii) taken from a normal distribution of values. A factory 115 may specify the initial location of a particle relative to a physical and/or virtual geometry element. This then allows a user to specify the location where particles are injected into (or originate within) the simulation system.

An important aspect of analysis tools 190 is the ability to calculate bulk statistics and aggregate properties based on the raw particle-scale results data. Such analysis involves selecting or grouping the particles together as desired. The analysis tools 190 allow a user to create a selection, which represents a list of elements, such as particles or physical geometry elements, that satisfy one or more specified criteria. The analysis tools 190 can then perform queries/graphing on just a part of the simulation, i.e. on the selected elements, rather than all of them. A selection may be used, for example, to change the colouring and/or representation options for the selected group of elements in a visualisation of the simulation outcome 180.

In the EDEM version 2.1.2 simulation system, two selection methods are available. The first method (referred to as manual selection) allows a user to select a set of particles at a given time using a visualization of the simulation. The three-dimensional particle locations from the simulation are projected onto the screen for the visualization in accordance with a selected viewing angle. A user defines a two-dimensional region, e.g. a box, on the screen, and all particles that appear to lie within that region are selected. These particles may then be marked differently, for example by using a different colour. As the visualization is subsequently moved forwards (or backwards) in time, the particles retain their differentiation (selection or grouping), irrespective of whether they remain in the specified region. This method of particle selection is therefore well-suited to investigating the trajectories of particles through the simulation, for example to find out where particles in a given region at a given time end up (or originate from).

The second method of particle selection (referred to as grid bin groups) in the EDEM version 2.1.2 simulation system utilises the intrinsic coordinate system (x, y, z axes) of the simulation. A user defines a grid of rectangular boxes (bins) that are aligned with this coordinate system—i.e. every box face is perpendicular to one of the axes. The analysis tools 190 can then provide information concerning the aggregate properties (such as number, mass, etc) of the particles that are located within each box at any given time. It is straightforward for the analysis tools to identify a particle as being within a specific grid box by comparing the x, y and z coordinates of the particle with the corresponding limits of the box. It will be noted that in this second method (unlike the first method) the selected particles are not fixed through time. Rather, the selection of particles will vary with time according to the current locations of the particles in relation to the bin boundaries.

In accordance with an embodiment of the present invention, the simulation system 100 supports a further selection method within analysis tools 190. This method is illustrated in schematic form in FIG. 2. In operation 210, the user specifies a virtual geometry object. The system allows this to be done in two ways (analogous to the specification of the virtual geometry for a particle factory). The first way is that the simulation system 100 allows a certain range of shapes to be defined within the simulation system itself. The second way is that the simulation system 100 is able to import a shape created using a separate computer-aided design (CAD) system.

Figure 2:
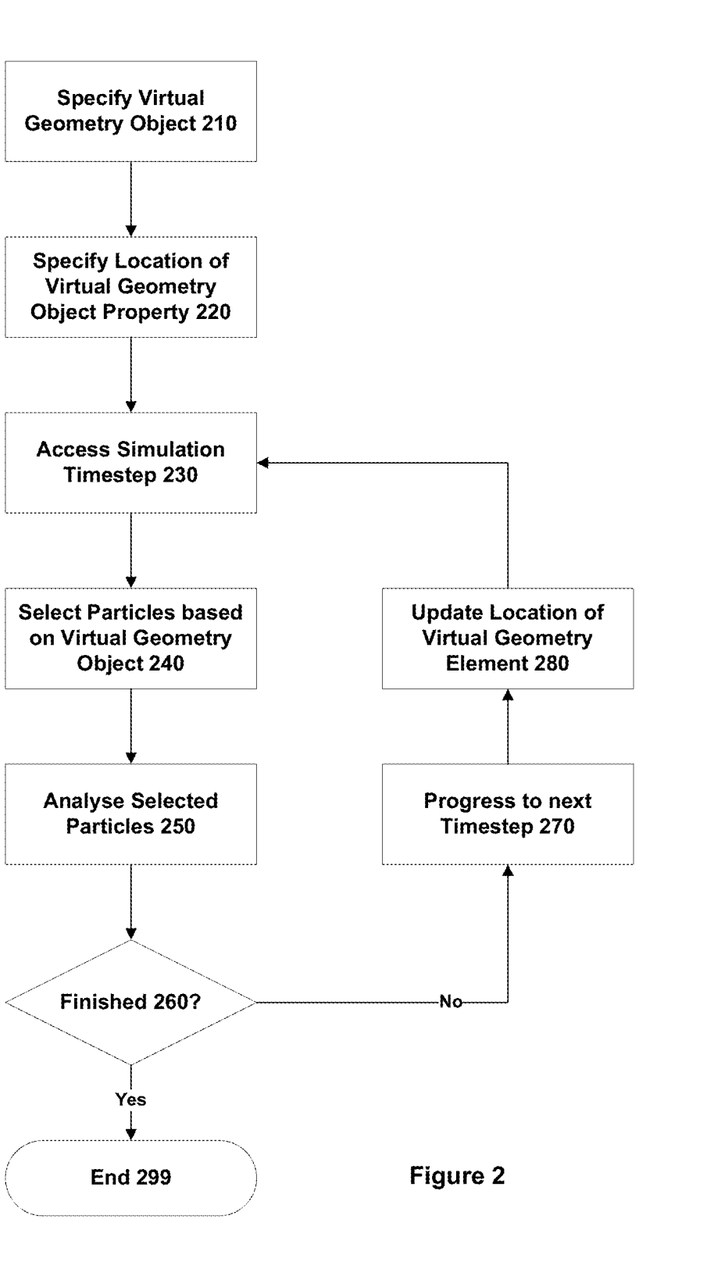
FIG. 2 is a high-level flow-chart showing the use of a virtual geometry object for particle selection in accordance with one embodiment of the invention.

Note that the shape of the virtual geometry object specified at operation 210 is arbitrary, in the sense that the user can define the exact shape that they want. This is in contrast to the first method described above (manual selection), where the shape in three-dimensions is necessarily an orthogonal projection of the two-dimensional shape defined on the screen, and also in contrast to the second method described above (grid bin selection), where the shape in three-dimensions is necessarily a grid of rectangular cuboids.

In one embodiment, the user also specifies how a particle is selected in relation to the shape of the virtual geometry object. For example, if the shape represents an open surface, then a particle might be selected in relation to the shape if the particle crosses through the surface in a specified time interval. Alternatively, if the shape represents a complete surface, thereby defining a closed volume, then a particle might be selected in relation to the shape if the particle lies within the closed volume. Another possibility is that a particle might be selected if it lies within a certain distance of the surface of the virtual geometry object (irrespective of whether the shape represents an open or complete surface).

Some implementations may only support a certain type (or types) of selection mechanism. For example, an implementation may limit the selection of particles to those that are within a virtual geometry object that represent a closed volume. This in turn imposes a topological requirement on the virtual geometry object (it must define a closed volume). The user is then able to define an arbitrary shape for the virtual geometry object, subject to this topological requirement.

In operation 220, the user specifies the location for the virtual geometry object within the three-dimensional space of the simulation. The location allows both the position and orientation of the virtual geometry object to be defined. Furthermore, the location is allowed to vary with time, in other words the virtual geometry object is able to move (and rotate) through the coordinate space as the simulation progresses. One option is to link the location of the virtual geometry object to a physical geometry element within the simulation. In this case, the location of the virtual geometry object is specified with reference to the physical geometry element. Therefore, if the physical geometry element moves (translation and/or rotation), the virtual geometry object moves in the same way.

In operation 230, for a specified time value (timestep), the simulation output 180 is accessed. The simulation output 180 includes a listing of particles and their properties for each time value, as well as the positions of any physical geometry elements. The particle positions from the simulation output 180 are now compared at operation 240 with the location of the virtual geometry object, and those particles are selected that satisfy the specified criterion (or criteria) in relation to the virtual geometry object—e.g. are inside, or close to, or have passed through the surface of the virtual geometry object.

For example, if the virtual geometry object is a closed volume, the listing of particles may be scanned, and the position for each particle is tested to see whether or not it lies within the solid volume. Those particles that are found to lie within the closed volume are selected. Note that in some embodiments, other elements, such as physical geometry elements, may be selected at operation 240 in addition to (or instead of) the particles 120.

At operation 250, an analysis is performed in respect of the selected elements, e.g. particles. This analysis may involve calculating one or more bulk properties for the set of selected particles, such as total or average mass, voidage, mix ratio, etc. Another possibility is that the analysis involves a visualisation, and the selected particles are differentiated, for example by colour, from the non-selected particles.

In operation 260, it is determined if the analysis is complete. If so, the analysis exits at operation 299. However, if the analysis is not yet complete, the analysis progresses at operation 270 to the next timestep. This usually involves moving forwards in positive time increments through the simulation data, but there may be circumstances in which it is decided to analyse the simulation progressing backwards in time (if supported by the system).

At operation 280, the location of the virtual geometry object is updated to the new time value. Processing now returns to operation 230 to determine which particles are selected by the virtual geometry object for this new time value. The newly selected particles are then analysed or visualised as discussed above at operation 240, and the processing is repeated until the analysis is completed (i.e. a positive outcome at operation 260).

Note that the location of the virtual geometry object may be based on the location of a physical geometry element in the simulation. In this case, updating the location of the virtual geometry object (as per operation 280) will involve accessing the position of the physical geometry element at the relevant timestep from the simulation output (as per operation 230), so that operation 280 will have to be performed after operation 230. In other embodiments, the position of the virtual geometry object may be fixed throughout the simulation, so that no updating is required at operation 280.

In many cases, the testing of operation 240 is just performed on the current data values, e.g. location, for the particles, as obtained at operation 230. This approach can be used, for example, when the virtual geometry object is a solid volume, and the test of operation 240 is to determine whether or not a given particle is inside the solid volume. A similar approach can be used when the selection mechanism is for particles within a certain range of the surface of the selected virtual geometry object.

In another embodiment, the selection mechanism may identify particles that have passed through the surface of the virtual geometry object in the previous time increment. In this case, the selection may involve analysing the particle properties for both the current timestep and also for the previous timestep. Alternatively, the particle properties might be specified to include not only current position, but also information indicative of the previous position, for example, the previous position itself, the vector translation of the particle in the previous time increment, or the velocity of the particle (from which the vector translation of the particle in the previous, known, time increment could be estimated). This information might be included as a fixed (standard) property of the particles, or could be added via the custom property feature described above. Knowing both the current position and the immediately preceding position will allow the selection mechanism to determine whether a given particle has crossed the surface of the virtual geometry object in the preceding time increment.

Figure 3:
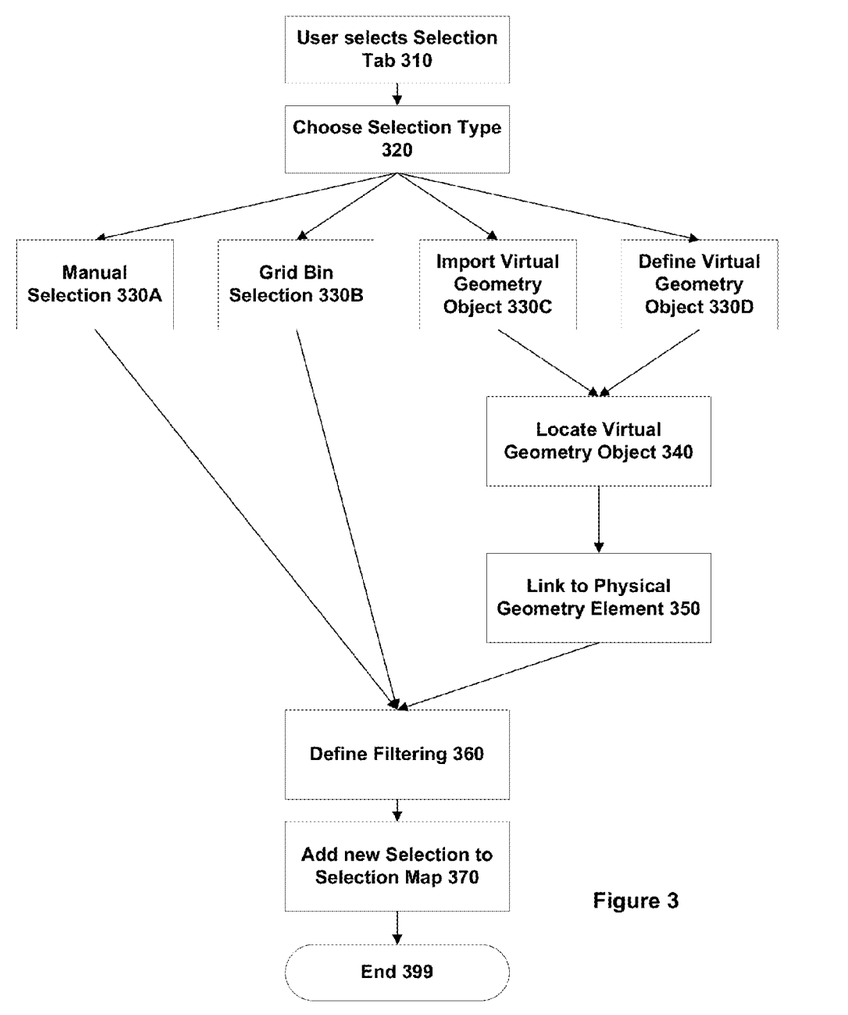
FIG. 3 is a high-level flow-chart showing user operations to define particle selection in accordance with one embodiment of the invention.

FIG. 3 is a flowchart illustrating how a user defines a selection within the analysis tools 190 in accordance with one embodiment of the invention. The user firstly clicks on a Selection tab 310 and then chooses the desired type of selection or grouping 320. In one embodiment, there are four options or modes available. The first two options are the manual and grid bin selections 330A and 330B respectively, as available in the existing EDEM version 2.1.2 simulation system (these will not be described in detail). The final two options are based on a virtual geometry object (also referred to as a geometry bin). In option 330C, the user imports a virtual geometry object from a CAD system. In option 330D, the user defines the virtual geometry object within the simulation system 100 itself.

At operation 340, the virtual geometry object (whether defined within or imported into the simulation system 100) is located within the simulation coordinate space 340. The virtual geometry object may also be (optionally) linked to a physical geometry element 350 at operation 350. If such a link is created, then the virtual geometry object can be considered as attached to, i.e. moving with, the specified physical geometry element during the simulation.

Irrespective of the selection mode chosen, the user is able to filter the elements that are selected 360 by the selection process (this filtering is described in more detail below). The completed definition of the selection is then added at operation 370 to a selection map for use in subsequent analysis and the flowchart terminates at operation 399. Note that multiple virtual geometry objects (and other selection mechanisms) may be utilised in combination during analysis of a single simulation.

Figure 4:
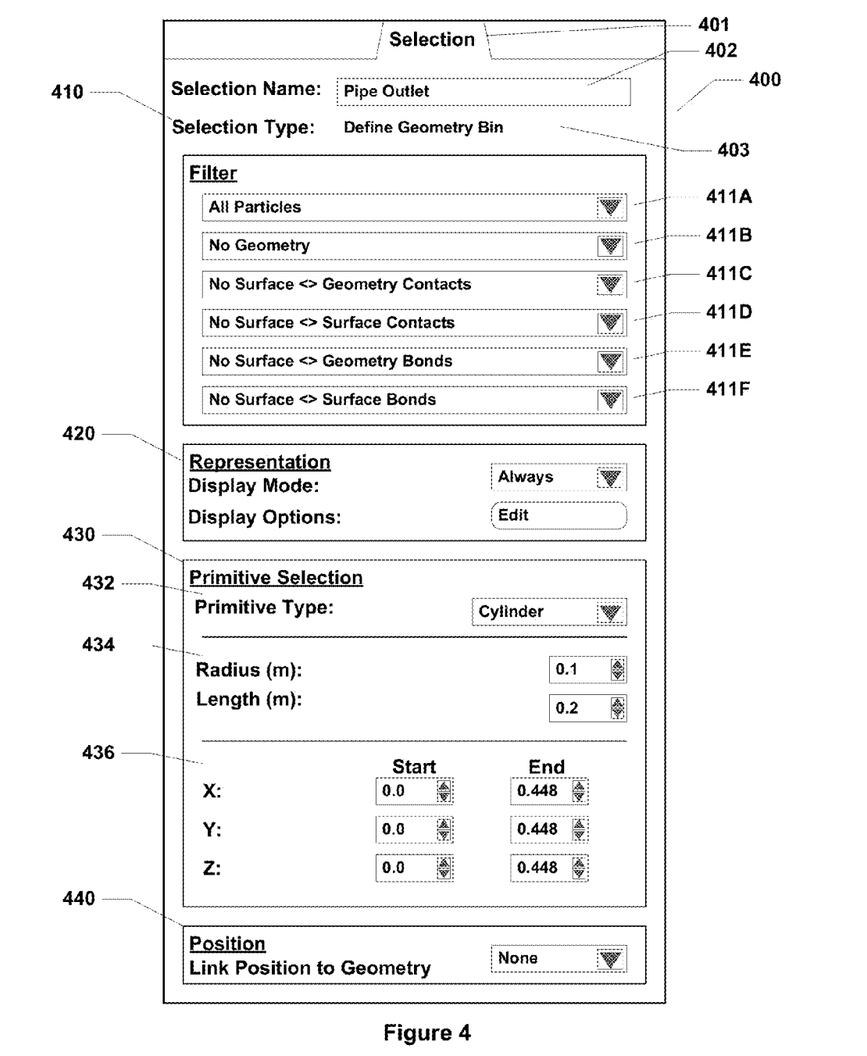
FIG. 4 is a schematic diagram of a user interface screen for defining a virtual geometry object in accordance with one embodiment of the invention.

FIG. 4 is a schematic diagram of a user interface screen 400 in accordance with one embodiment of the invention. User interface screen 400 is obtained by firstly activating the selection tab 401 at operation 310 from the flowchart of FIG. 3 (for simplicity, the other available tabs are omitted from the user interface screen of FIG. 4), and then by choosing the selection type at operation 320 corresponding to mode 330D—i.e. to define a virtual geometry object within the simulation system 100.

The user interface screen 400 allows the user to enter a name 402 for the virtual geometry object that is being defined. This name is used to distinguish this virtual geometry object from other such objects (as noted above, a simulation output 180 may be analysed with multiple different virtual geometry objects at the same time). The type (mode) 403 of the virtual geometry object is identified as "define geometry bin" corresponding to mode 330D.

Note that the mode 330D has already been specified at operation 320 in a screen previous to that shown in FIG. 4 (hence the selection type 403 can not be changed by the user on user interface screen 400). Note also that the remaining contents of user interface screen 400 are partly dependent on the selected mode, as will now be described.

The user interface screen 400 includes 4 main sections. The first section, entitled Filtering 410, corresponds to the filtering operation 360 shown in FIG. 3. The second section, entitled Representation 420, is used to specify whether and how the virtual geometry object is displayed during the visualisation. This can be used to control, for example, the colour assigned to the object for display, whether the object is shown as transparent, and so on. The third section, entitled Primitive Selection 430, allows the shape and location of the virtual geometry object to be specified, corresponding to operation 340 as shown in FIG. 3. The fourth section, entitled Position 440, allows the position of the virtual geometry object to be linked to a physical geometry element, corresponding to operation 350 as shown in FIG. 3.

(It is apparent from the screen 400 of FIG. 4 that the user may enter the various settings for a virtual geometry object in a different order from the flowchart illustrated in FIG. 3. For example, the filtering of section 410 might be specified before the primitive selection of section 430, whereas corresponding operations 360 and 350 respectively have the opposite order in the flowchart of FIG. 3. However, the skilled person will appreciate that it is generally only the final definition of the virtual geometry object which is significant, rather than the order in which the settings are entered).

The Primitive Selection section 430 is divided into three subsections. The first subsection 432 allows a user to select from a drop-down list that presents a set of available (primitive) shapes, such as cylinder, sphere, rectangular cuboid, etc. The second subsection 434 allows a user to specify the size of the selected shape. The third subsection 436 allows a user to specify the position and orientation of the selected shape.

It will be appreciated that the information to be provided in subsections 434 and 436 will depend on the selected shape of subsection 432 (and the user interface screen 400 will adjust accordingly). For example, the size of a sphere is determined by a single length representing its radius, and the position of the sphere by a single point representing its centre. In contrast, the size of a right circular cylinder is determined by two values representing the radius and length of the cylinder The position and orientation of the right circular cylinder can then be specified by providing two position values, one corresponding to the centre of the bottom face of the cylinder, and the other corresponding to the centre of the top face of the cylinder. Other shapes that can be utilised as primitives include a right circular frustrum, which is defined by three values representing the length (height) of the frustrum and the radius at each end. (The position of such a right circular frustrum is defined by the positions of the centres of each end face, as for a right circular cylinder).

As noted above, the Position section 440 allows the location of the virtual geometry object to be linked to a physical geometry element. The user is able to chose the physical geometry element (if any) with which the virtual geometry object is to be linked using a drop-down list that specifies that available physical elements. The movement (translation and rotation) of the virtual geometry object through the simulation then follows that of the linked physical geometry element. (Note that in the current setting shown in FIG. 4, no linkage is specified between the virtual geometry object and the physical geometry object).

It will be appreciated that other embodiments may support other mechanisms for moving the virtual geometry objection through the simulation (instead of or in addition to linking to a physical object). For example, the simulation system may allow a user to enter specific movement information for the virtual geometry object, analogous to entering the size and orientation information. Other possibilities are that the position or movement of the virtual geometry object is read from a look-up table or file, or generated by an external model.

Filtering section 410 allows certain selection criteria to be specified with respect to the virtual geometry object. In other words, the elements to be selected must not only have the appropriate spatial relationship to the virtual geometry object, but they must also satisfy the criteria set out in filtering section 410. This allows the user to perform a more focussed and powerful analysis of the simulation outcome 180.

In the embodiment shown in FIG. 4, the Filtering section 410 includes 6 predefined filtering options, 411A, 411B, 411C, 411D, 411E and 411F. Option 411A relates to the type of particles that are selected. The default is to select all particles that fulfil the relevant positional relationship with the virtual geometry object (such as being located within the object, or adjacent to its surface). However, it is also possible to specify that only certain types of particles are selected. For example, the simulation may concern the mixing of two different types of material, A and B, where material A comprises particles A and material B comprises particles B. The filter option 411A can be set so that only particles A but not particles B (for example) are selected at operation 240 from FIG. 2.

Option 411B relates to the selection of physical geometry elements. The default is that no such physical geometry elements are selected, but simulation system does allow filter option 411B to be set so that at operation 240 from FIG. 2, physical geometry elements that have the specified positional relationship with the virtual geometry object are selected (together with any particles specified in option 411A). This facility exploits the fact that the simulation output 180 includes position information for the physical geometry elements at each time step (as well as for all the particles).

Options 411C, 411D, 411E and 411F differ from options 411A and 411B in that rather than identifying individual items (particles or physical geometry elements), they involve a relationship between two items. Option 411C covers surface-to-surface contact between a particle and a physical geometry element; option 411D covers surface-to-surface contact between two particles; option 411E covers the presence of a bond between a particle and a physical geometry element; and option 411F covers the presence of a bond between two particles. (A bond is produced by a force interaction between the relevant items, as defined in behaviour model 140, but does not generally require contact).

The default setting for options 411C, 411D, 411E and 411F is that no such selections are made. However, if one or more of these options is turned on, then at operation 240 from the flowchart of FIG. 2, the analysis tools will look for the presence of the specified contact or bond having the desired positional relationship with the virtual geometry object. For example, if option 411D is turned on, the system looks for any contacts that satisfy the relevant positional relationship with respect to the virtual geometry object (such as being located inside the virtual geometry object).

It will be appreciated that there are many ways in which the position of a contact or bond can be determined. In one embodiment, if a bond is formed between two particles, the position of the bond might be considered as the midpoint between the two particles forming the bond. Likewise, if the contact between two particles occurs at a single point, then this point may be taken as the position for determining the relevant positional relationship with respect to the virtual geometry object. Alternatively, if the contact is over an extended area, then it might be required, e.g., for (a) all, (b) any, or (c) a mean or average position of the extended area to satisfy the relevant positional relationship with the virtual geometry object. For example, the system might select a contact if any of the contact area lies within a virtual geometry object representing a closed volume.

Filtering section 410 is common to all the different selection modes 330A, 330B, 330C and 330D to allow filtering criteria to be specified with respect to the chosen selection mode—manual, grid bins, or virtual geometry object. It will be appreciated that other embodiments may provide different or additional filtering options from those shown in FIG. 4, depending on the particular requirements of any given implementation.

As mentioned above, FIG. 4 presents the user interface screen 400 after the selection of mode 330D to define a virtual geometry object. The user interface screen after the selection of mode 330C to import a virtual geometry object is similar to user interface screen 400, but the Primitive Selection section 430 shown in FIG. 4 is replaced by a facility to identify a CAD file specifying the virtual geometry object to import into the simulation. The user interface screens provided after the selection of mode 330A or 330B are configured to allow a user to set the appropriate selection criteria for each of these two modes.

Figure 5:
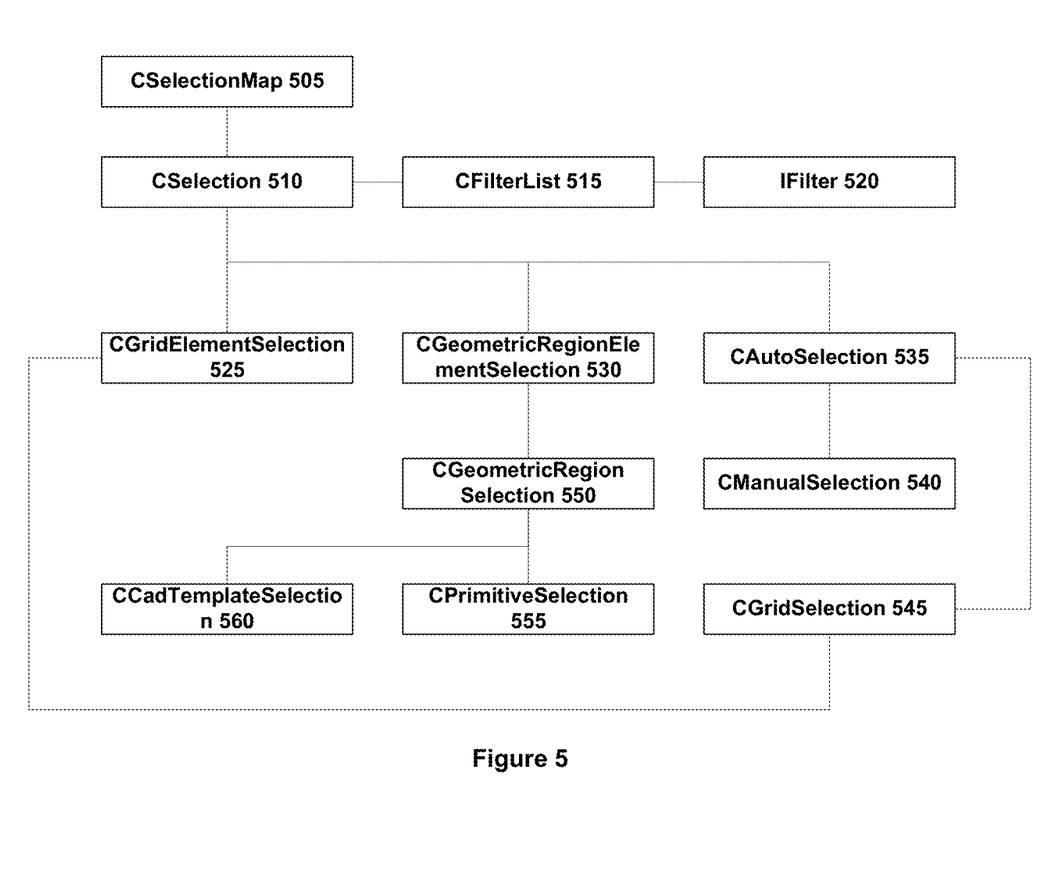
FIG. 5 is a simplified diagram of various data structures used for implementing particle selection in accordance with one embodiment of the invention.

FIG. 5 is a schematic illustration of certain data structures (C++ classes) used to implement virtual geometry objects as described above in accordance with one embodiment of the invention. The CSelection class 510 forms the core of the selection system and contains lists of the particles, physical geometry elements (represented as triangles), contacts and bonds that are selected as per operation 240 from FIG. 2. These lists can then be used as part of a data export, for graphs, and for controlling the representation (e.g. colour, whether or not depicted, etc) of the relevant items in a visualisation of the simulation. Simulation system also supports that ability to add queries to the selections. These queries can be displayed on screen or in the data browser (an html report window)

The CSelectionMap class 505 functions as a holder for the various selections derived from CSelections and provides methods to query and run operations on these selections (as previously mentioned, multiple different selections may be defined within the simulation system 100).

The CSelection class interacts with a single CFilterList class 515. If an attempt is made to add an element (such as a particle, physical geometry element, etc) to a list, CSelection invokes an allow method on CFilterlist. If the method returns "true", the element is added as appropriate to the lists maintained by CSelection, otherwise the element is discarded.

The CFilterlist class stores a list of instances of IFilter classes 520. The operation of these IFilters depends on the setting of the Filtering section 410 from FIG. 4 as described above. For example, the Filtering section 410 can be used to specify that only a particular type of particle is to be selected. An allow method call from CSelection 510 to CFilterlist 515 results in corresponding allow method calls to all loaded IFilter instances. CFilterlist 515 can then assemble the various responses to these calls from the different IFilter instances and provide a single coordinated response back to CSelection 510.

There are three types of selection class that derive from the CSelection class. The first of these, the CGridElementSelection class 525, is used to implement the grid bin selection mode 330B from FIG. 3. The second, the CGeometricRegionElementSelection class 530, is used for selection via a virtual geometry object, whether imported or specified by a user within the simulation system 100, and thereby corresponds to modes 330C and 330D. The third, CAutoSelection class 535, is used for selection via a virtual geometry object, corresponding to modes 330C and 330D, and also for manual selection, corresponding to mode 330A.

The CAutoSelection class 535 describes a selection group that is capable of making its own choice as to what elements are selected for some or all of its lists of elements. CAutoselection does not select any elements itself, rather this selection is handled by classes that derive from it. CAutoselection does ensure however that for any given time-step, the derived selections contain all elements that meet both the criteria for the derived classes and also match all loaded instances of IFilter 520. The CManualSelection class 540 derives from the CAutoSelection class 535 and allows a user to specify particle (and/or physical geometry elements) for selection, as described above with reference to mode 330A.

The CGridElementSelection class 525 derives from CSelection and represents a single cell of the grid or lattice for grid bin selection (corresponding to mode 330B). This class is controlled by the CGridSelection class 545, which derives from the CAutoSelection class. It contains a grid or lattice of identically sized, axis-aligned, rectangular cuboid bins, each corresponding to a CGridElementSelection. This collection of cuboid bins together implement the grid bin selection of mode 330B.

The CGeometricRegionElementSelection 550 derives from CSelection and represents a single virtual geometry object. It is controlled by a parent class CGeometricRegionSelection 555, which derives from CAutoSelection. CGeometricRegionSelection represents a series of geometric regions, each corresponding to an instance of CGeometricRegionElementSelection, that are managed as a single group of selections. Thus if multiple virtual geometry objects are defined, then the overall group of as a (composite) virtual geometry object comprising multiple virtual geometry elements (where each individual geometry element also represents a virtual geometry object in its own right). In this case the selections are performed at both the level of individual virtual geometry elements (as sub-selections), and also at the group level by aggregating the sub-selections into a single overall selection. The analysis tools 190 present information and visualisation for both the individual virtual geometry elements (sub-selections) and also for the group selection representing the composite virtual geometry object.

For example, a simulation may be performed for an apparatus having multiple compartments. An individual virtual geometry element may be defined to correspond to each compartment, and a sub-selection is defined to correspond to each individual virtual geometry element. This group of sub-selections then allows tracking of particle information with respect to the apparatus as a whole, i.e. as the aggregate of all the individual virtual geometry elements.

The CCadTemplateSelection class 560 and the CPrimitiveSelection class 565 are specializations of CGeometricRegionSelection. CCadTemplateSelection enables the use of an imported CAD template as a virtual geometry object, as described above with respect to mode 330C. The CAD template may specify multiple virtual geometry objects for use together as a selection group. CPrimitiveSelection corresponds to mode 330D and the user interface screen of FIG. 4, and allows a user to define a single virtual geometry object within the simulation system itself.

Figure 6:
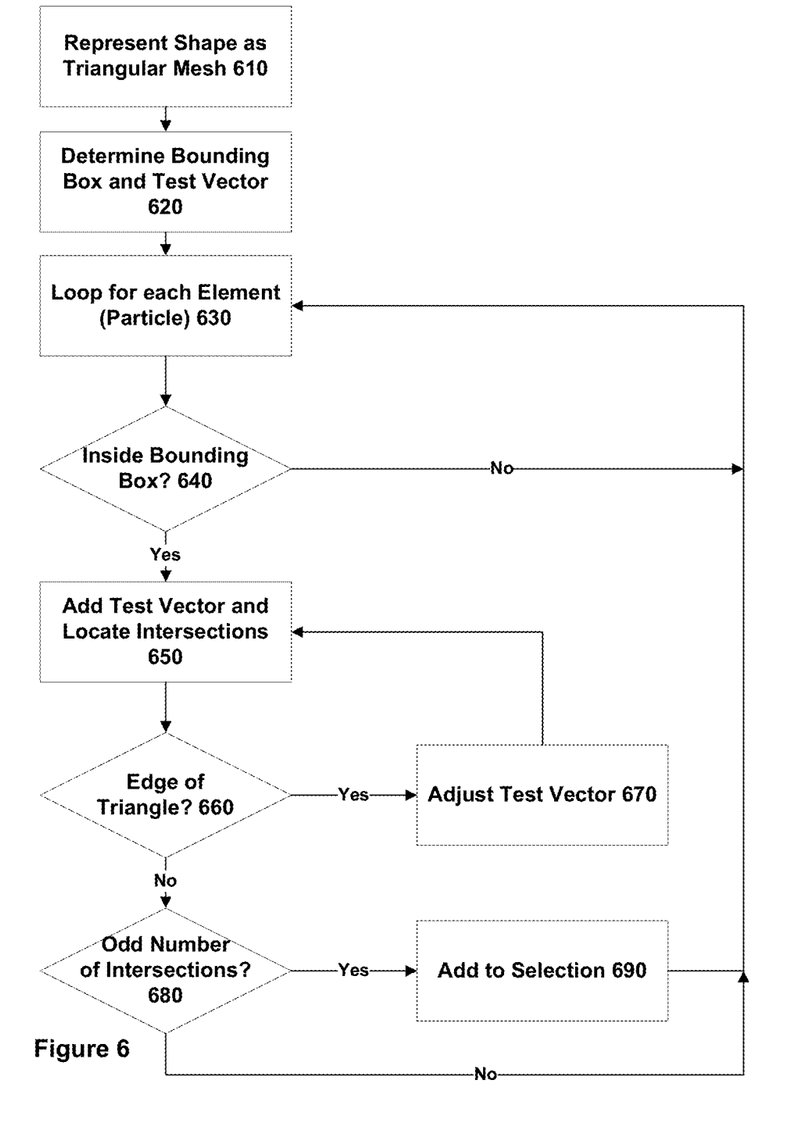
FIG. 6 is a high-level flowchart illustrating in more detail a method for selecting a particle with respect to a virtual geometry object in accordance with one embodiment of the invention.

FIG. 6 is a flowchart illustrating how a selection is performed with respect to a virtual geometry object in accordance with one embodiment of the invention. In this particular embodiment, the selected elements are particles, and they are selected if they lie inside the virtual geometry object (which therefore represents a closed volume). The processing of FIG. 6 assumes that there is only a single virtual geometry object, but can be repeated as appropriate for each virtual geometry object if multiple virtual geometry objects are present.

In the initial processing of operation 610, the surface of the virtual geometry object is represented using a surface tessellation. In one embodiment, this tessellation is based on a mesh of plane triangles, but other embodiments may use other geometric shapes (or combinations thereof) to represent the surface. This representation is calculated by CPrimitiveSelection or by CCadTemplateSelection as appropriate (or the imported CAD template may already be provided as a triangular mesh). The use of a mesh for the virtual geometry object allows an arbitrary surface to be defined. Other embodiments may use different formulations for representing the surface of the virtual geometry object, for example spherical harmonics, or other non-linear surface boundary representations.

The remaining processing of FIG. 6 corresponds generally to operation 240 from FIG. 2, and is used to identify those elements (e.g. particles) that are contained within a given virtual geometry object for a given timestep. This processing will usually be repeated for each timestep, with the position of the virtual geometry object being updated, if required, for each new timestep (as per operation 280 of FIG. 2).

At operation 620, the system determines the bounding box for the virtual geometry object. This can be done by looking at the coordinates of each triangle in the mesh and identifying the highest and lowest values along each coordinate axis. A test vector is now created that is bigger than the maximum (diagonal) dimension of the bounding box. It is therefore known that if one end of the test vector lies inside the shape of the virtual geometry object, the other end of the test vector must lie outside the bounding box and hence outside the shape itself.

The system now enters a loop 630 for each element (e.g. particle) within the simulation output that satisfies any relevant filtering conditions. At operation 640 it is tested to see whether the position of the particle lies within the bounding box determined at operation 620. It will be appreciated that this can be done very quickly using a simple comparison of the coordinates of the particle position with the coordinates of the bounding box. If it is found that the particle lies outside the bounding box, then it is known that the particle cannot lie inside the virtual geometry object. Processing therefore loops back to operation 630 to investigate the next particle.

However, if the particle is found to lie within the bounding box at operation 640, then it is possible (but not certain) that the particle also lies within the virtual geometry object. In order to determine whether or not the particle does lie within the virtual geometry object, the test vector is started at the location of the particle and the number of intersections between the test vector and the triangular mesh is counted at operation 650 (for the full length of the test vector). In particular, for each triangle of the mesh, it is determined whether or not there is an intersection between the mesh triangle and the test vector. One way of doing this (for example) is to determine the point of intersection between the test vector and the plane of the mesh triangle, and then deciding whether or not this point of intersection lies within the mesh triangle itself.

The number of intersections is counted and it is tested at operation 680 whether or not this number is odd or even. If the number if odd, then it is known that the test vector must have started inside the virtual geometry object, since we already know it ends up outside the virtual object (given the length of the test vector). In this case, the particle position where the test vector started must therefore lie inside the virtual geometry object, and so the particle is added to the selection at operation 690. Conversely, if the number of intersections is even, then it is known that the test vector must have started outside the virtual geometry object (since it again finishes outside the virtual geometry object). Therefore the particle does not lie within the virtual geometry object, and hence it is not added to the selection list. In either case, processing returns to loop 630, and repeats until all of the particles have been investigated and added to the selection list for the virtual geometry object if appropriate. At this point other virtual geometry objects and/or other timesteps can be investigated as required.

One complication in the processing of FIG. 6 is if the test vector passes through or very close to the edge of a test triangle (given the limits of computational accuracy), since it is then difficult to know whether to count this as zero, one or two intersections. Accordingly, it is detected whether such an edge intersection has occurred at operation 660 and if so, the results from the test vector are discarded. Instead, the orientation of the test vector is shifted in a random direction at operation 670, but keeping the start position of the test vector as the relevant particle position. Processing then returns to operation 650 to repeat the determination of the number of test vectors.

In one embodiment, the maximum number of re-tries via operation 670 in the event of an edge collision is set to five. If the test at operation 660 is still negative, i.e. there is an edge collision for all five orientations of the test vector, the particle is held to be outside the virtual geometry. Other embodiments however may set a different (or unlimited) number of re-tries.

Figure 7A:
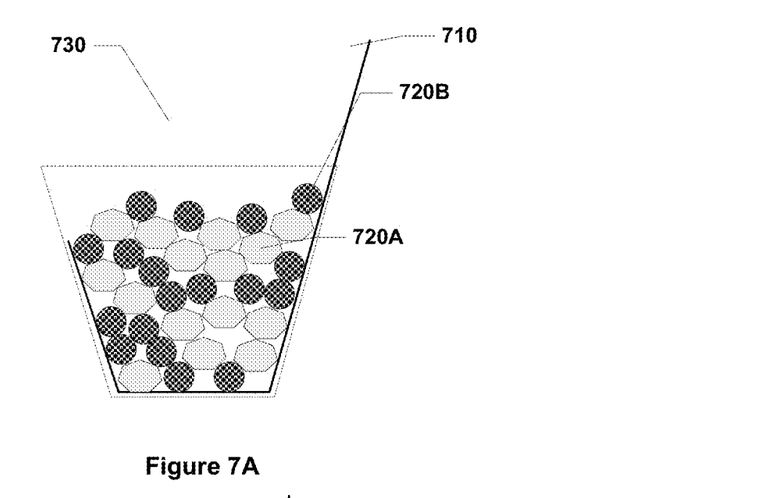
FIGS. 7A and 7B are schematic diagrams illustrating an application of a virtual geometry object in accordance with one embodiment of the invention.
Figure 7B:
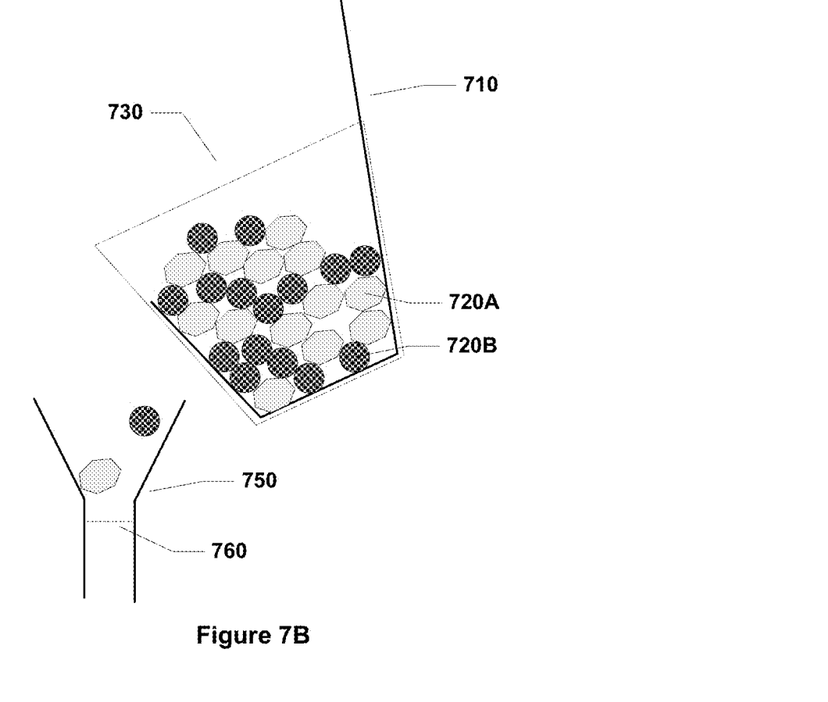

FIGS. 7A and 7B are schematic diagrams illustrating the application of a virtual geometry object in accordance with one embodiment of the invention. For clarity these diagrams provide a two-dimensional representation only, although it will be appreciated that an actual simulation will be performed in three-dimensional space (and a virtual geometry object will likewise be defined in three-dimensions).

FIGS. 7A and 7B illustrate a scoop 710. This represents a physical geometry element within the context of the simulation. The scoop 710 holds two types of particles, say particle A (shown schematically as heptagons 720A) and particle B (shown schematically as circles 720B). A virtual geometry object 730 is defined to match the shape of the scoop 710. This can be used to determine the contents of the scoop in terms of particle A and/or particle B (depending on the setting of the filtering, as per operation 360 of FIG. 3).

FIG. 7A depicts the scoop as full, while FIG. 7B depicts the scoop starting to empty into a pipe 750. Note that in leaving scoop 710, the particles have passed straight through the virtual object 730, since this is transparent to the objects in terms of the simulation—i.e. there is no physical interaction between the particles 720 and the virtual geometry object 730 (hence the name "virtual"). A comparison of the contents of virtual object 730 between FIGS. 7A and 7B (as well as at intermediate positions) can be used to investigate, for example, how the total contents and mix of particles inside the scoop change with angle as the scoop starts to tip. This might be used to decide how fast to tip the scoop, for example, in order to preserve a good mix of particle A with particle B.

FIG. 7B also depicts a virtual geometry object 760 located within pipe 750. In contrast to virtual geometry object 730, which measures contents inside the virtual geometry object 730, virtual geometry object 760 could be used to measure flow-rate down the pipe based on the number of particles that cross through the surface of virtual geometry object 760. This could then be used to investigate, for example, whether there is any spillage—i.e. particles that are tipped out of scoop 710 but then miss pipe 750, or whether there is any congestion at the mouth of the pipe 750. This might then be used to determine the best size for pipe 750, how fast to tip the scoop 710, and so on.

The use of virtual geometry objects as described so far has been limited to post-simulation analysis, i.e. the investigation of simulation outcome 180 with analysis tools 190. However, the virtual geometry objects could also be integrated into the simulation itself for use by the execution engine 110. For example, in the embodiment shown in FIGS. 7A and 7B, virtual geometry object 730 may be used to determine the total number of particles in the scoop. This in turn may be used to calculate the weight that the scoop is holding. This may then impact various factors such as the shape of the scoop (it may flex if holding more weight), the maximum rate of movement and/or tipping of the scoop, etc. The execution engine 110 can determine these factors based on the information obtained during calculation of the simulation and use them to influence subsequent stages of the simulation.

In summary, the approach described above therefore allows a user to define a virtual object for use in a DEM simulation. The object may comprise any surface in 3-dimensional space, where the surface may be complete, thereby defining a solid body, or open. The surface may be used as a basis for calculation of properties and/or statistics, as well as in a behaviour model, and is used to define or group a set of particles or other model elements as appropriate. For example, the surface may be used to identify those model elements (e.g. particles, sub-particle elements, or physical geometry elements) located on the surface of the object, or those particles passing through the surface, or those elements contained within its closed volume, or those elements located in a region referenced against the object's global position in the three-dimensional space. The object is considered to be a virtual object as it does not physically interact with the physical elements such as particles in the simulation. The virtual geometry can be used in a variety of analysis operations, including, but not limited to, data binning, extraction and visualisation operations.

Any appropriate CAD model may be imported and used as a virtual geometry object. This allows an exact copy of a complex-shaped surface or volume to be used as a basis for calculation of bulk particle statistics, metrics and parameters such as mass fraction, void ratio, stress state, average and total values of any particle property. A simulation system may also include a built-in CAD geometry capability which can be used to generate virtual geometry objects. More than one virtual geometry object (and any variety or combination of object shapes and/or sizes) can be used for or within a simulation.

The virtual geometry object may comprise a meshed surface or volume. The cells of the mesh can then be used in the calculation of the bulk statistics. Both structured and unstructured volume meshes may be used from coupled DEM-CFD (computational fluid dynamic) simulations. This enables the calculation of statistics relative to geometry reference frames derived from simulation and experimental data external to the DEM simulation.

The virtual geometry object allows the spatial sampling and extraction of data from a DEM results dataset within an arbitrary shaped volume or surface by locating the volume or surface at a particular position within the spatial domain of the DEM simulation. Moving the virtual volume or surface with time during the simulation provides a means of sweeping through the domain and gathering time-series data. By duplicating or mapping the movement of one or more physical geometry elements, this allows the analysis and visualisation of the simulation results to be coupled with the dynamics of physical geometry elements in the simulation. For example, a virtual geometry object can be used to calculate the rate of fill of an excavator bucket during a filling cycle by defining the virtual geometry object to have the same shape as the bucket. The virtual geometry object can then be moved to follow the path taken by the bucket. This approach allows those particles located inside the virtual volume to be identified, and therefore supports the calculation of desired metrics, such as mass or distribution of particle size within the volume, during the bucket filling cycle.

Apart from being used for post-simulation analysis, a virtual geometry object may also be located at an arbitrary (user-selected) position with the spatial domain of the DEM simulation during actual execution of the solver 110. In this approach, the virtual geometry object may be used, for example, to define a control volume (or surface) for the calculation of the run-time simulation data.

The approach described herein therefore extends the capability of DEM simulation system for both solver and post-processing operations. It supports a significant number of applications that are of importance to many customers. For example, potential applications include calculating the rate of fill of excavator and drag line buckets, hoppers, and dies, measuring the mass flow rate (and any other bulk particle property) in conveyor transfer or hopper discharge, and calculating changes in particle size distribution in mixing operations.

The simulation system described herein is generally implemented by executing one or more computer programs running on one or more computers as appropriate. Some or all of the functionality of the simulation system might be implemented using special-purpose hardware if so desired. Prior to execution, the computer programs may be stored in a computer-readable storage medium such as a hard disk drive, flash memory, an optical disk (e.g. DVD), and so on.

In conclusion, various embodiments of the invention have been described by way of example only, and having regard to particular environments and application requirements. The person of ordinary skill in the art will appreciate that many variations may be made to the particular implementations described herein without departing from the spirit and scope of the invention as defined by the appended claims and their equivalents.

The invention claimed is:

1. A computer-implemented method for discrete element modelling of a plurality of discrete elements corresponding to particles and physical geometry elements, wherein said modelling performs a simulation through time of physical interactions of the particles with each other and with the physical geometry elements in a three-dimensional space, the method comprising:

providing a virtual geometry object comprising a user-defined shape, wherein the virtual geometry object does not undergo physical interaction with the particles or physical geometry elements during the simulation;

receiving user-defined parameters for determining the position, orientation and any movement of the virtual geometry object with respect to the three-dimensional space, locating the virtual geometry object in the three-dimensional space during the simulation in accordance with the user-defined parameters;

using an analysis tool to select a list of particles by identifying particles that have a specified relationship with respect to the virtual geometry object; and a user specifying movement of the virtual geometry object through time with respect to the three-dimensional space, wherein the virtual geometry object is linked to a physical geometry element such that the virtual geometry object has the same movement through the three-dimensional space as the linked physical geometry element.

2. The method of claim 1, wherein a user specifies how a particle is selected in relation to the shape of the virtual geometry object.

3. The method of claim 2, wherein the shape of the virtual geometry object defines a closed three-dimensional volume, and a particle is selected for the list if it lies within the closed volume.

4. The method of claim 2, wherein the virtual geometry object comprises a surface, and a particle is selected for the list if it lies within a predetermined distance of the surface.

5. The method of claim 2, wherein the virtual geometry object comprises a surface, and a particle is selected for the list if it passes through the surface in a given time interval.

6. The method of claim 1, wherein the shape of the virtual geometry object is specified by a mesh.

7. The method of claim 6, wherein said mesh comprises a surface mesh.

8. The method of claim 6, wherein said mesh comprises a volume mesh.

9. The method of claim 6, wherein the virtual geometry object comprises a plurality of virtual geometry elements, each of which is itself treated as a virtual geometry object, and each element within said mesh represents a virtual geometry element.

10. The method of claim 1, wherein the virtual geometry object is provided by importing a specification of the shape.

11. The method of claim 10, wherein the virtual geometry object comprises a plurality of virtual geometry elements, each of which is itself treated as a virtual geometry object, and wherein the imported shape specification comprises said plurality of virtual geometry elements.

12. The method of claim 1, wherein the identification of the particles, physical geometry elements and/or physical interactions having a specified relationship with respect to the virtual geometry object is performed in respect of data produced by the simulation after completion of the simulation.

13. The method of claim 1, wherein the identification of the particles, physical geometry elements and/or physical interactions having a specified relationship with respect to the virtual geometry object is performed while the simulation is in progress and is used to alter subsequent timesteps of the simulation.

14. The method of claim 1, wherein the analysis tool calculates one or more bulk properties for the set of selected particles.

15. The method of claim 14, wherein the calculated bulk properties include at least one of total or average mass, voidage and mix ratio.

16. The method of claim 14, wherein the virtual geometry object comprises a mesh representing a surface or volume, the mesh comprising cells which are used in the calculation of the bulk statistics.

17. The method of claim 1, wherein the analysis tool provides a visualisation of the simulation, whereby the selected particles are differentiated from the non-selected particles.

18. The method of claim 17, wherein the differentiation is by colour.

19. The method of claim 1, wherein the analysis tool selects particles for the list by identifying particles that have a specified relationship with respect to the virtual geometry object and that also satisfy one or more additional criteria.

20. A non-transitory computer-readable storage medium storing program code for implementing a method for discrete element modelling of a plurality of discrete elements corresponding to particles and physical geometry elements, wherein said modelling performs a simulation through time of physical interactions of the particles with each other and with the physical geometry elements in a three-dimensional space, the method comprising:

providing a virtual geometry object comprising a user-defined shape, wherein the virtual geometry object does not undergo physical interaction with the particles or physical geometry elements during the simulation, receiving user-defined parameters for determining the position, orientation and any movement of the virtual geometry object with respect to the three-dimensional space, locating the virtual geometry object in the three-dimensional space during the simulation in accordance with the user-defined parameters, using an analysis tool to select a list of particles by identifying particles that have a specified relationship with respect to the virtual geometry object; and a user specifying movement of the virtual geometry object through time with respect to the three-dimensional space, wherein the virtual geometry object is linked to a physical geometry element such that the virtual geometry object has the same movement through the three-dimensional space as the linked physical geometry element.

21. A computer-implemented simulation system for discrete element modelling of a plurality of discrete elements corresponding to particles and physical geometry elements, wherein said modelling performs a simulation through time of physical interactions of the particles with each other and with the physical geometry elements in a three-dimensional space, the simulation system comprising:

a data structure specifying a virtual geometry object comprising a user-defined shape, wherein the virtual geometry object does not undergo physical interaction with the particles or physical geometry elements during the simulation, a user interface for receiving user-defined parameters for determining the position, orientation and any movement of the virtual geometry object with respect to the three-dimensional space, processing means for locating the virtual geometry object in the three-dimensional space during the simulation in accordance with the user-defined parameters, and an analysis tool to select a list of particles by identifying particles that have a specified relationship with respect to the virtual geometry object; and wherein the simulation system is further configured for a user specifying movement of the virtual geometry object through time with respect to the three-dimensional space, wherein the virtual geometry object is linked to a physical geometry element such that the virtual geometry object has the same movement through the three-dimensional space as the linked physical geometry element.

* * * * *